Jan. 24, 1956  S. S. MINER  2,731,668
DIPPING MACHINE FOR FORMING RUBBER ARTICLES
Filed Feb. 6, 1953  11 Sheets-Sheet 1

_Fig_1

INVENTOR.
SAMUEL S. MINER
BY
Irwin M. Lewis
ATTORNEY

Jan. 24, 1956 S. S. MINER 2,731,668
DIPPING MACHINE FOR FORMING RUBBER ARTICLES
Filed Feb. 6, 1953 11 Sheets-Sheet 5

INVENTOR.
SAMUEL S. MINER
BY
Irwin M. Lewis
ATTORNEY

Jan. 24, 1956

S. S. MINER

2,731,668

DIPPING MACHINE FOR FORMING RUBBER ARTICLES

Filed Feb. 6, 1953

INVENTOR.
SAMUEL S. MINER
BY
Irwin M. Lewis
ATTORNEY

Jan. 24, 1956  S. S. MINER  2,731,668
DIPPING MACHINE FOR FORMING RUBBER ARTICLES
Filed Feb. 6, 1953  11 Sheets-Sheet 7

INVENTOR.
SAMUEL S. MINER
BY
Irwin M. Lewis
ATTORNEY

United States Patent Office 2,731,668
Patented Jan. 24, 1956

2,731,668

DIPPING MACHINE FOR FORMING RUBBER ARTICLES

Samuel S. Miner, Mishawaka, Ind., assignor to United States Rubber Company, New York, N. Y., a corporation of New Jersey Application February 6, 1953, Serial No. 335,440

8 Claims. (Cl. 18—24)

This invention relates to a machine intended primarily to be used for dipping forms into liquid latex and other liquid chemicals to form thin walled rubber articles but capable of other uses where it is desired to impart certain desired movements to a form or article.

One object of the invention is to provide apparatus for supporting and presenting an article in various positions so that various operations can be performed thereon.

Another object is to provide apparatus of such flexibility that it may be easily adapted for supporting and moving a variety of articles in a variety of different paths of movement.

Another object of the invention is to provide apparatus which will automatically remove a form or article from a conveyor, move the form or article in a predetermined path, and replace the article on the conveyor.

A still further object of the invention is to provide apparatus capable of imparting certain desired motions to dipping forms in the dipping and withdrawal of the forms from latex and coagulant baths to control the flow of the latex on the forms so as to evenly and uniformly distribute the latex to prevent the formation of localized thickened portions and to prevent the entrapment of air between the latex film and the forms.

Another object is to provide a dipping machine which will automatically dip one set of forms in a bath of liquid latex while a second set of forms previously dipped in the bath of latex is being dipped in a bath of liquid coagulant.

To accomplish the above objects, the apparatus includes a novel arm assembly which moves in timed relationship with a conveyor and picks up a form or article from the conveyor, moves it in a predetermined path, and transfers it to a second arm assembly which in turn moves it in a predetermined path and replaces it on the conveyor. Each of the arm assemblies is capable of imparting three distinct motions to the form so that any desired resultant path of movement may be imparted to the forms by varying one or more of these three distinct motions.

Other objects and advantages of the present invention will become apparent from the following description when read in conjunction with the accompanying drawings wherein.

Figure 1:
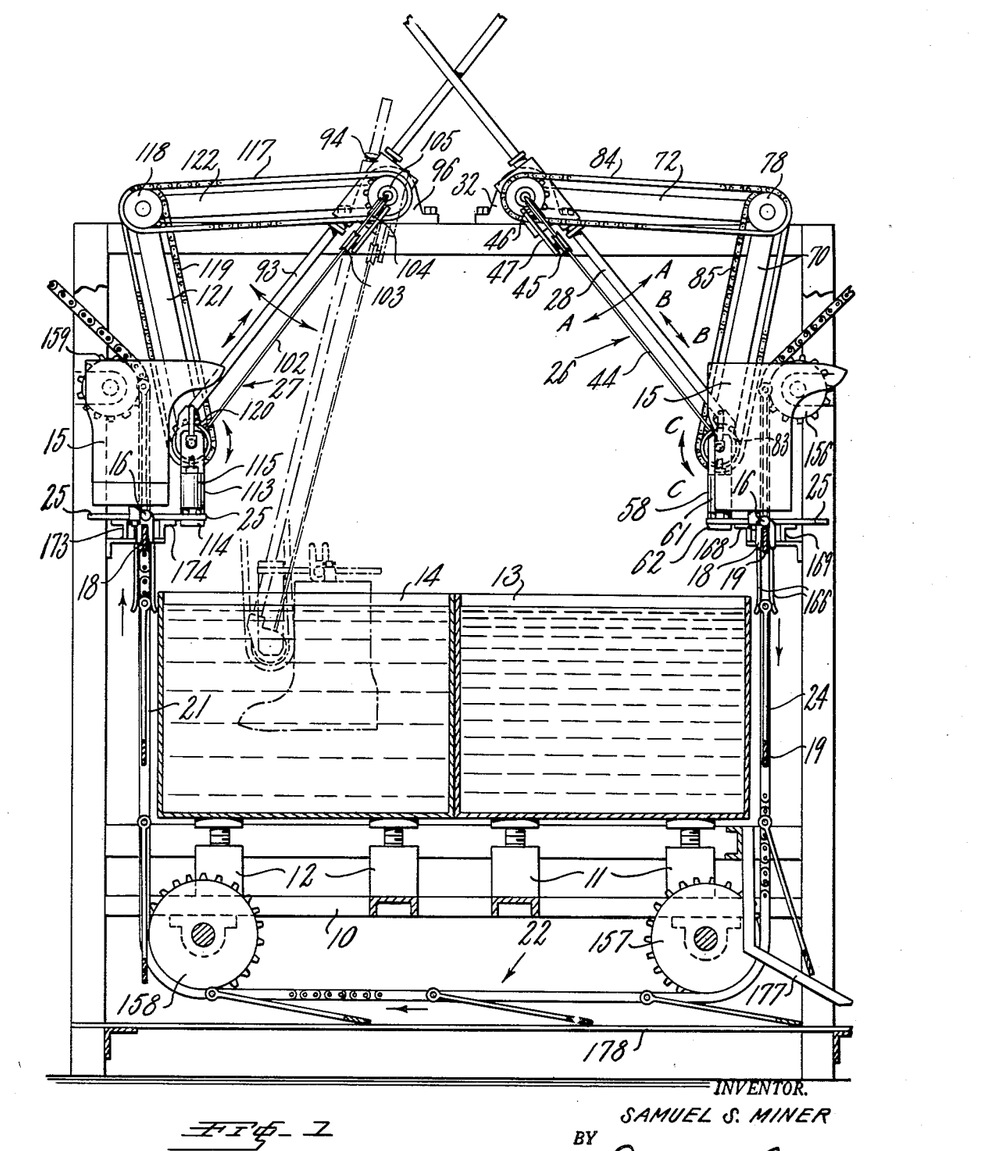
Fig. 1 is a front elevational view of the machine of the invention as used for dipping forms into baths of latex and coagulant to form thin walled rubber articles; the right hand arm assembly of the machine being shown removing forms from a conveyor and the left hand arm assembly being shown replacing previously dipped forms back on the conveyor.
Figure 2:
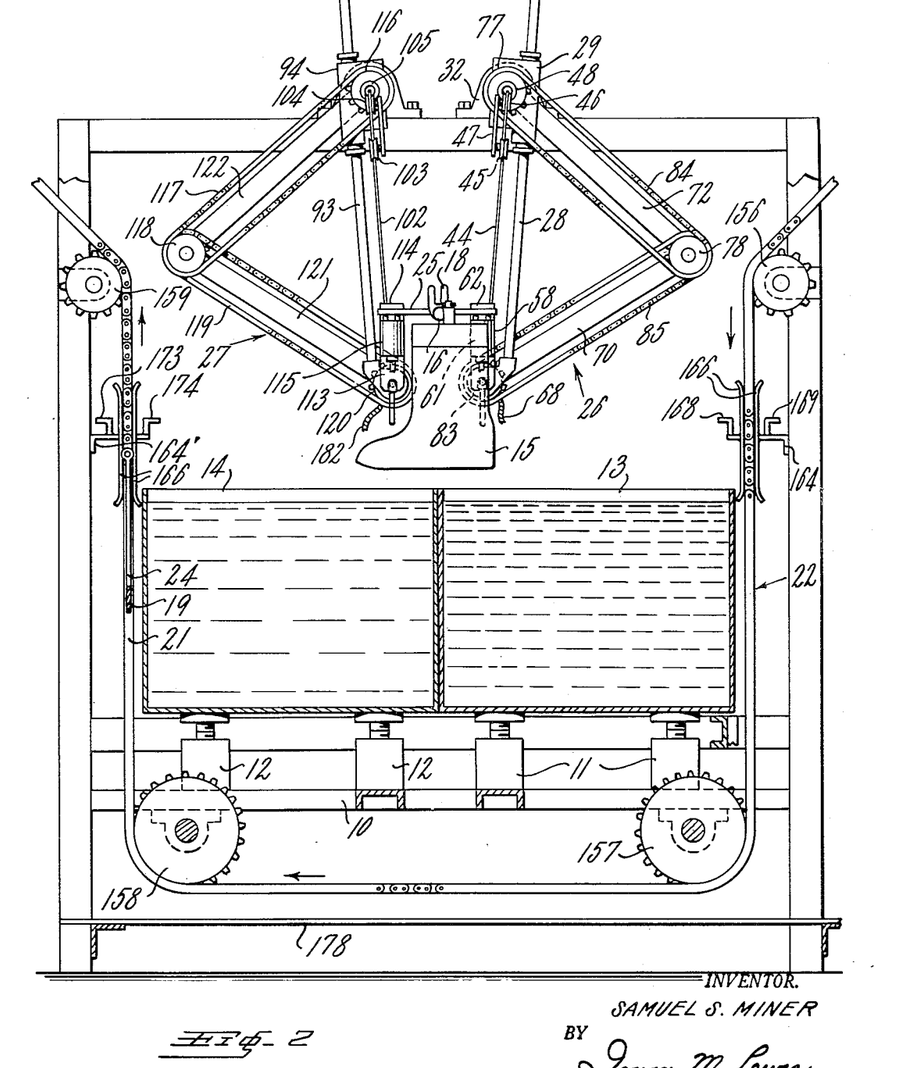
Fig. 2 is a front elevational view of the machine of the invention, similar to that of Fig. 1, but showing previously latex dipped forms being transferred from the right hand arm assembly to the left hand arm assembly so that they can be dipped thereby in the coagulant bath.

Referring to the drawings, and in particular to Figs. 1 and 2 of the drawings, the present invention as used for forming thin walled rubber articles includes, a supporting frame 10 upon which is mounted screw jacks 11 and 12. Jacks 11 support a tank 13 of liquid latex and jacks 12 support a tank 14 of liquid coagulant, such as acetic acid, into which dipping forms 15 are adapted to be sequentially dipped to form thin walled rubber articles. The jacks 11 and 12 provide for individual vertical adjustment of the tanks 13 and 14. For the purpose of illustration, the forms 15 are disclosed as boot shaped but it is to be understood that the apparatus may be used for dipping forms of other shapes.

Figure 14:
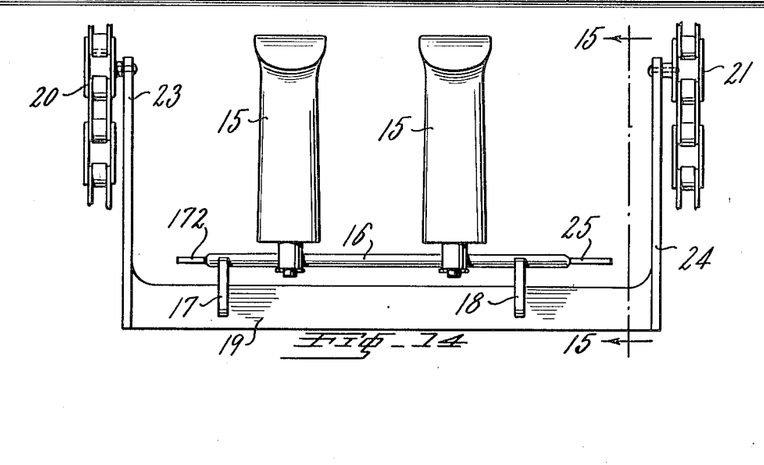
Fig. 14 is an elevational view of a section of the conveyor showing how the forms are removably mounted on the conveyor.
Figure 15:
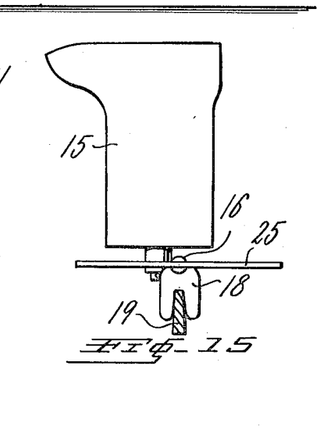
Fig. 15 is a sectional view taken on the line 15—15 of Fig. 14.

As best shown in Figs. 14 and 15, the forms 15 are rigidly secured in an inverted position to a rod 16. The rod 16 is provided with spaced integral bifurcated lugs 17 and 18 which are adapted to be slipped over one of a number of tapered crossbars 19 which are pivotally hung in trapeze fashion from spaced parallel chains 20 and 21 of an endless chain conveyor, generally designated by the reference numeral 22. The crossbars 19 are pivotally hung from the chains 20 and 21 by means of rigid straps 23 and 24 secured to the ends of the rod 16 and pivotally attached to the chains 20 and 21. The conveyor 22 serves to convey the forms 15 to the latex tank 13 and away from the coagulant tank 14. The forms 15 are mounted on the rod 16 with their center of gravity approximately above the lugs 17 and 18 so that when the rod 16 and the forms 15 secured thereto are placed on one of the crossbars 19, they will maintain a substantially upright position as shown in Fig. 1. The rod 16 has a transversely extending plate 25 rigidly secured to one end thereof by which it is clamped and supported in the dipping operations as will hereinafter be described.

Figure 10:
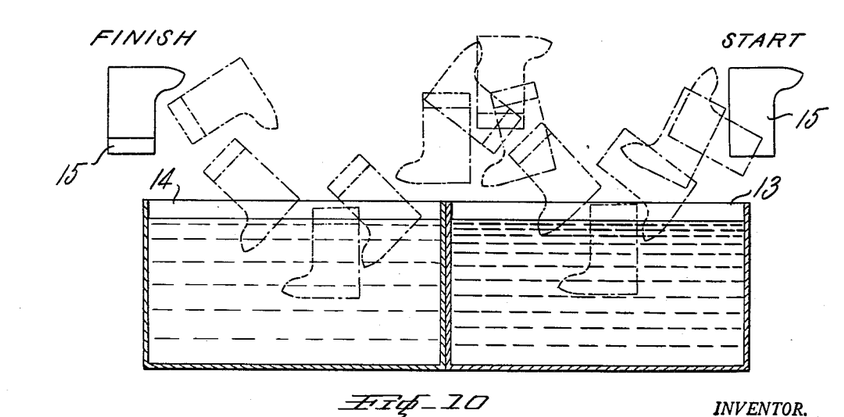
Fig. 10 is a schematic drawing showing a typical path of movement imparted to the forms by the machine in dipping the form sequentially into the baths of latex and coagulant.

Referring to Figs. 1 and 2 the chain conveyor 22 moves down one side of the latex tank 13, under both tanks 13 and 14 and up the side of the coagulant tank 14. At a point adjacent the latex tank 13, the rod 16 with the forms 15 secured thereto is removed from the conveyor 22 by a special arm assembly generally designated by the reference numeral 26. The arm assembly 26 dips the forms into the latex tank 13 and moves them to a point midway of the apparatus where they are transferred to a second similar arm assembly 27 which dips them in the coagulant tank 14 and replaces them on the conveyor 22. In Fig. 1, the arm assembly 26 is shown as removing the rod 16 with the forms 15 secured thereto from the conveyor 22 and arm assembly 27 is shown in dashed lines as dipping another set of forms 15 in the coagulant tank 14 and in solid lines as replacing a set of forms 15 back on the conveyor 22. In Fig. 2, the arm assemblies 26 and 27 are shown in the transfer position in which the rod 16 and the forms 15 secured thereto are transferred from the arm assembly 26 to the arm assembly 27. The arm assemblies 26 and 27 are designed to give a very intricate pattern of movement to the forms in the dipping and withdrawal of the forms 15 from the latex and coagulant baths to thereby carefully control the flow of the latex on the forms to prevent the formation of localized thickened portions and an entrapment of air between the latex film and the form. A typical pattern of movement which the apparatus is capable of imparting to the forms 15 is shown in Fig. 10.

Figure 3:
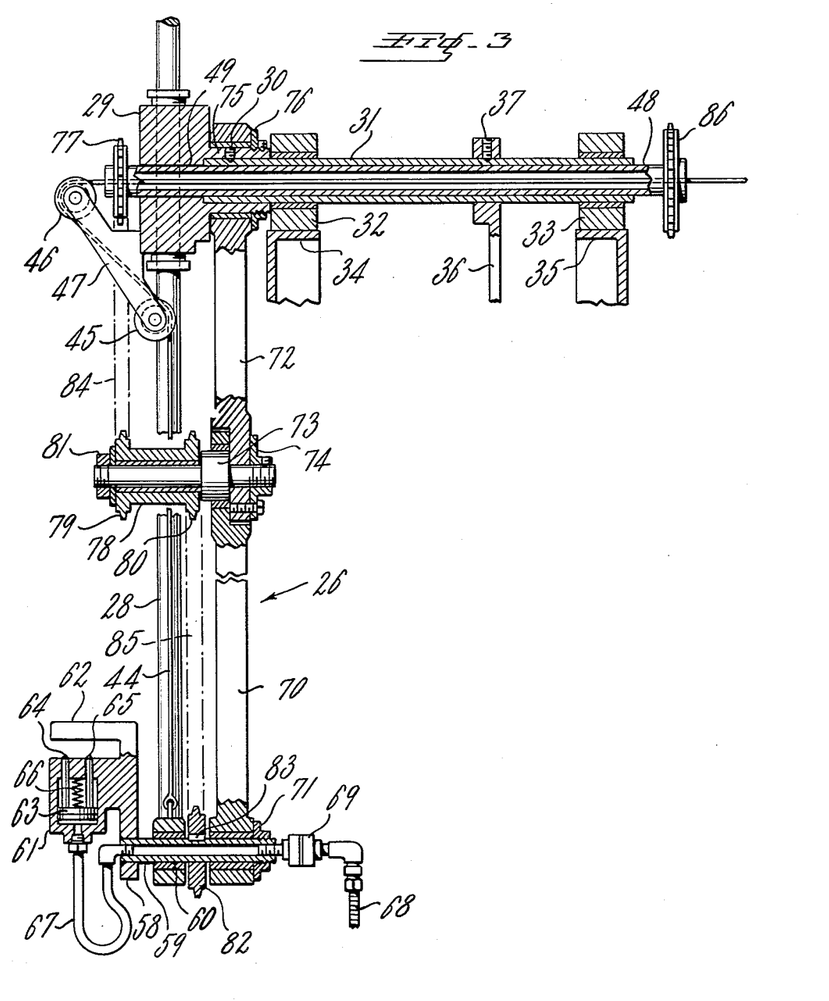
Fig. 3 is an enlarged side elevational view, partly in section, showing the details of the right hand arm assembly of Fig. 2.
Figure 4:
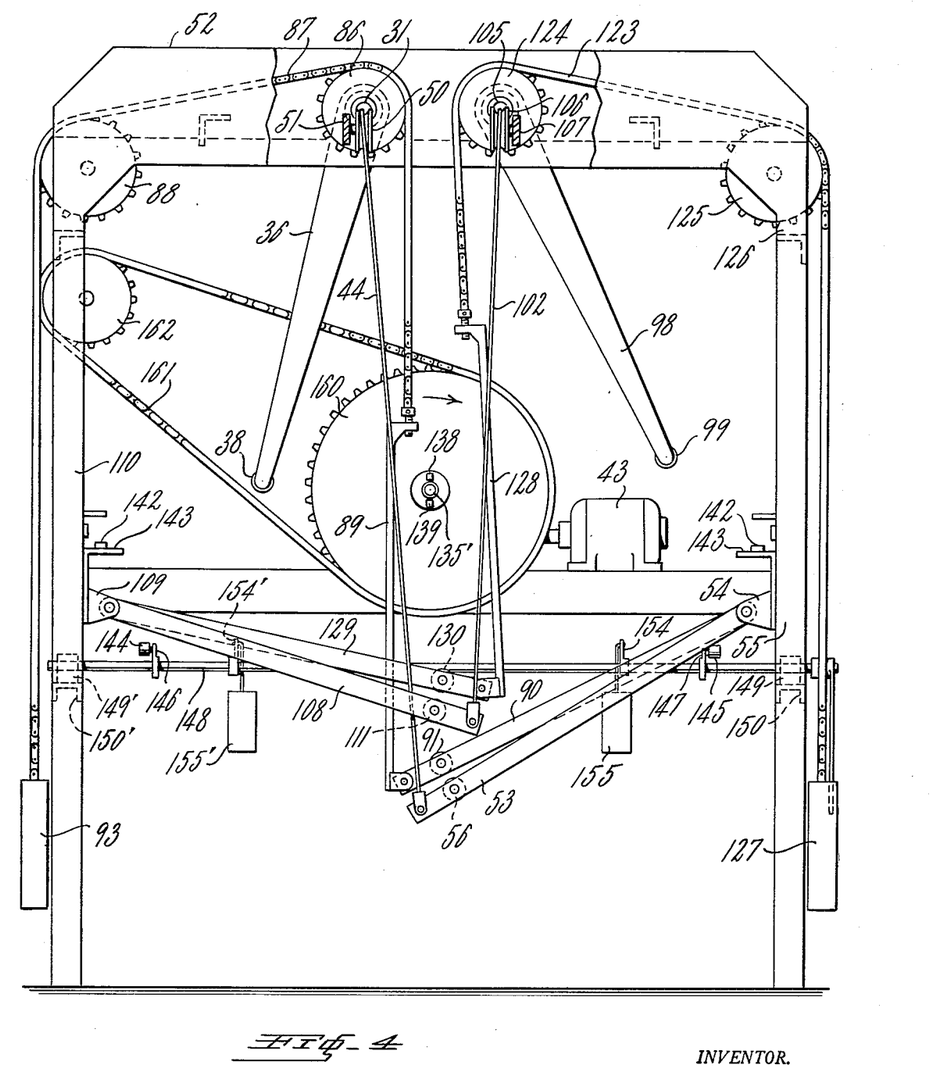
Fig. 4 is a rear elevational view of the machine showing the machine with the actuating cams removed.
Figure 5:
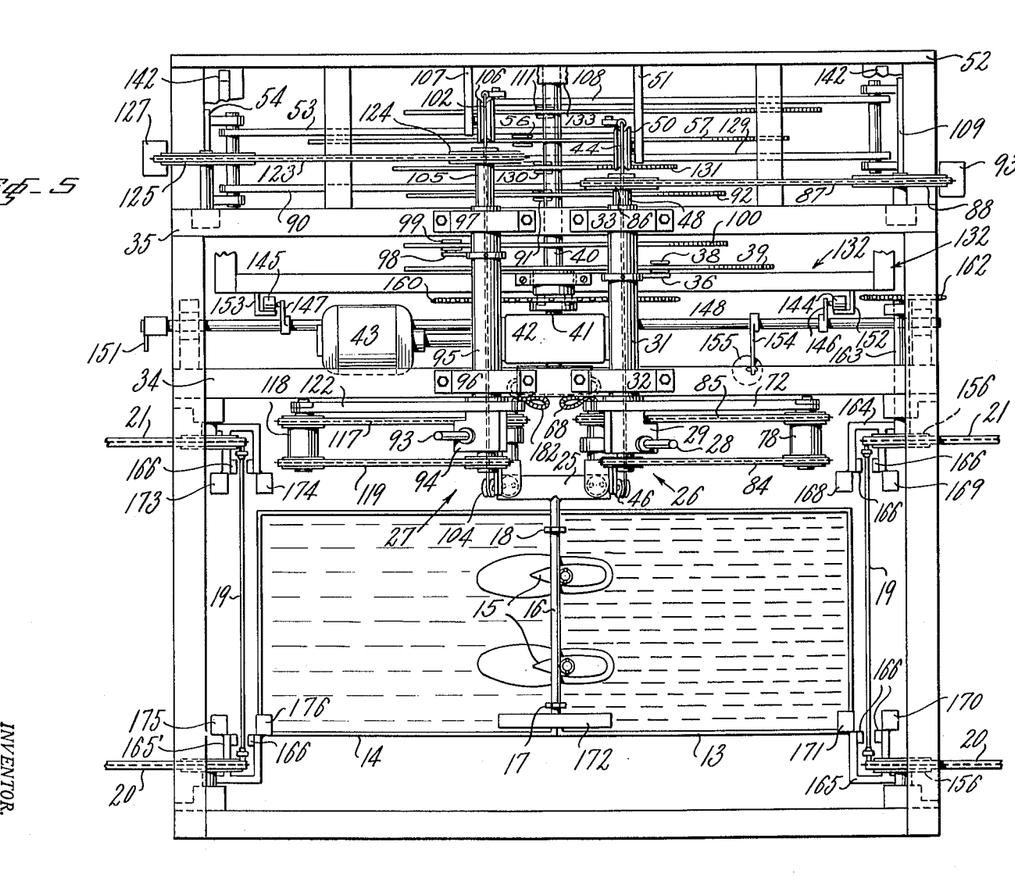
Fig. 5 is a top plan view of the machine showing the actuating cams in place.

Referring to Fig. 3, the arm assembly 26 includes an elongated rod 28 which is slidably mounted for linear movement in a bearing 29. Bearing 29 is in turn secured by means of a set screw 30 to the end of a hollow shaft 31. Shaft 31 is rotatably mounted in spaced bearings 32 and 33 secured to horizontal framework members 34 and 35 above and to the rear of the latex tank 13. A lever arm 36 is secured to the shaft 30 intermediate its ends by a set screw 37. As best shown in Fig. 4, the lever arm 36 is provided with a cam follower roller 38 which, as shown in Fig. 5, engages the peripheral edge of a disc cam 39. The cam 39 is secured to a shaft 40 which is coupled at one end to the output shaft 41 of a speed reducer 42. Speed reducer 42 is driven by a motor 43. Rotation of cam 39 serves to move lever arm 36 which in turn swings shaft 31, bearing 29 and rod 28 about the axis of the shaft 31 as indicated by the arrow A—A associated therewith in Fig. 1.

Figure 6:
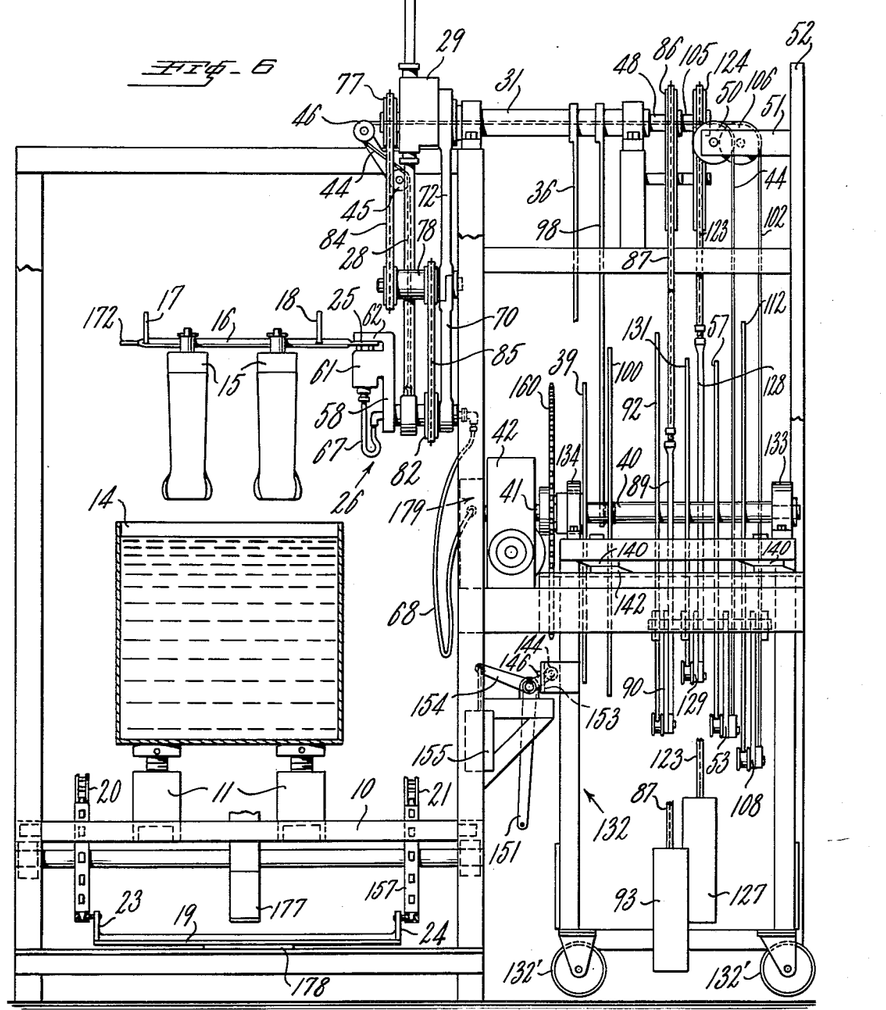
Fig. 6 is a side view of the machine showing the actuating cams in place.

Referring to Figs. 1 and 3, a flexible cable 44 is secured at one end to the lower end of the rod 28. Cable 44 is directed up and around freely rotatable sheaves 45 and 46 carried by a bracket 47 secured to the bearing 29 and extends through the bore of a hollow shaft 48. Shaft 48 is rotatably mounted in the bore of the hollow shaft 31. Shaft 48 also extends through a bore 49 provided in the bearing 29 and is freely rotatable with respect thereto. As best shown in Figs. 5 and 6, the cable 44 extends from the rear end of the shaft 48 and is directed around a freely rotatable sheave 50 carried by a bracket 51 secured to a horizontal framework member 52 at the rear of the machine. The end of the cable, as shown in Fig. 4, is pivotally attached to the free end of a lever arm 53. The lever arm 53 is pivotally attached at its other end to a bracket 54 secured to a framework member 55 at one side of the machine. The lever arm 53 is provided with a cam follower roller 56 which, as shown in Figs. 5 and 6, engages the peripheral edge of a disc cam 57 secured to the shaft 39.

Movement imparted to the lever arm 53 by rotation of the cam 57 is transformed by the cable 44 into linear movement of the rod 28 as indicated by the arrow B—B associated therewith in Fig. 1.

Referring again to Figs. 1 and 3, an arm 58 is secured to the end of a short hollow shaft 59. Shaft 59 is rotatably mounted in an opening 60 in the lower end of the rod 28. An air cylinder 61 and an opposed clamping jaw 62 are formed as integral parts of the arm 58. Air cylinder 61 includes a piston 63 and piston rods 64 and 65. The piston rods 64 and 65 are adapted to be extended by admission of air under pressure to the cylinder 61 to clamp the plate 25 secured to the end of the rod 16 against the jaw 62 to thereby clamp the rod 16 and forms 15 secured thereto to the arm 58 for movement therewith. A spring 66 serves to retract the piston rods 64 and 65 when the air is released from the cylinder 61. Air is admitted to the air cylinder 61 through a conduit 67 attached at one end to the air cylinder 61 and at the other end to one end of the hollow shaft 59 and through a flexible conduit 68 attached by means of a swivel coupling 69 to the other end of the hollow shaft 59. As will hereinafter be described in detail, the conduit 68 is connected to a source of air under pressure through a control valve which controls the admission of air to the cylinder 61. The length of the arm 58, and the orientation of the clamping jaw 62 with respect to the center of shaft 59, are governed by the size and shape of the articles to be processed. Preferably the arrangement of these parts should be such that an extension of the center line of the hollow shaft 59 would pass through the centers of gravity of the articles. These same considerations will apply to the arm assembly 27, to be described below.

An arm 70 is rotatably mounted at one end on the shaft 59 and is retained thereon by a nut 71. At the other end, the arm 70 is hinged to one end of a second arm 72 by means of a pivot pin 73 which is secured to the arm 72 by means of a nut 74. The other end of the second arm 72 is rotatably mounted on a shoulder 75 of the bearing 29 and is retained thereon by a nut 76.

A sprocket 77 is secured to the end of the hollow shaft 48 adjacent the bearing 29. A double sprocket 78 providing two spaced but interconnected sprockets 79 and 80 is rotatably mounted on an extension of the pivot pin 73 and is retained thereon by a nut 81. A sprocket 82 is mounted on the hollow shaft 59 and keyed thereto by a key 83. A chain 84 connects sprockets 77 and 79 and a chain 85 connects sprockets 80 and 82 so that shaft 59 and arm 52 secured thereto will be rotated upon rotation of shaft 48 as indicated by the arrows C—C associated therewith in Fig. 1. The arms 70 and 72 serve to support the double sprocket 78 and to maintain constant center distances between the sprockets 77, 79, 80 and 82 upon linear and pivotal movement of the rod 28.

A sprocket 86 is secured to the opposite end of the shaft 48 from the sprocket 77. As best shown in Fig. 4, the sprocket 86 is engaged by a chain 87 which extends over a freely rotatable sprocket 88 secured to a framework member at one side of the machine. One end of the chain 87 is attached to one end of an elongated link member 89 which is pivotally attached at its other end to the free end of a lever arm 90. The lever arm 90 is pivotally attached at its other end to the bracket 54 secured to the framework member 55 at one side of the machine. A freely rotatable cam follower roller 91 is secured to the lever 90 and, as best shown in Figs. 5 and 6, engages the periphery of a disc cam 92 which is secured to the shaft 40. A weight 93 is secured to the other end of the chain 87 and serves to hold the cam follower 91 in contact with the peripheral edge of the disc cam 92. Pivotal movement imparted to the lever 90 by rotation of the cam 92 moves chain 87 to thereby rotate sprocket 86. Rotation of sprocket 86 serves to rotate arm 58 through shaft 48, sprocket 77, chain 84, sprocket 79, sprocket 80, chain 85, and sprocket 82.

Figure 9:
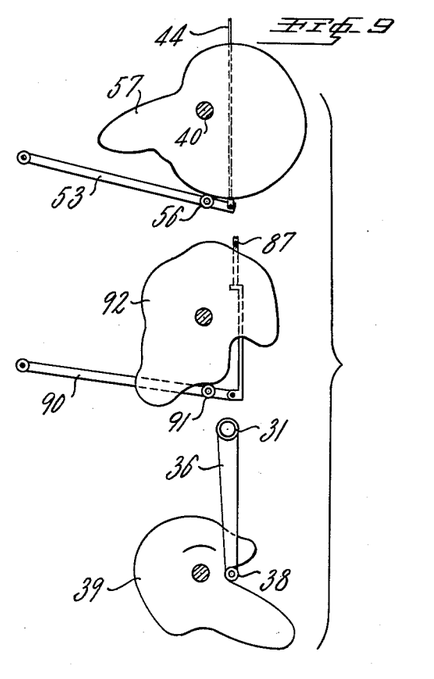
Fig. 9 is a front elevational view showing the approximate profiles of each of the actuating cams for moving the right hand arm assembly and the positions of the cams and actuating levers when the arm is in the transfer position shown in Fig. 2.

From the above description, it can be seen that the rod 28 is capable of both pivotal and linear movement and that the arm 58 is capable of rotary movement with respect to the end of the rod 28. These motions are combined to give a desired resultant path of movement to forms 15 clamped to the arm 58 by the selection of proper shaped cams 39, 57 and 92. In Fig. 9, there is shown the approximate shape of cams 39, 57 and 92 for imparting to the forms 15 a path of movement in dipping them in the latex tank 13 as shown in Fig. 10. As shown in Fig. 10, the boot shaped forms 15 are removed from the conveyor in an inverted position and are turned over and dipped into the latex tank 13 toe first. The presentation of the toe first prevents splashing and entrapment of air between the latex film and the sole portion of the forms 15. The forms are dipped to the proper depth and then withdrawn toe last from the latex tank 13. After withdrawal of the forms 15, they are again inverted to distribute the latex on the forms and prevent formation of localized thickened portions. The forms 15 are then reinverted and moved to a position midway of the machine where they are transferred to the arm assembly 27 which dips them into the coagulant tank 14 and replaces them on the conveyor 22.

The arm assembly 27 is of similar construction and functions in a similar manner to the arm assembly 26, and dips the forms 15 in the coagulant tank 14 and replaces them on the conveyor 22. The arm assembly 27 is constructed from parts identical to those of arm assembly 26 but the manner of assembly is such as to create a mirror image of the arm assembly 26. This manner of assembly allows the arms 26 and 27 to perform their required functions without interference with each other or with other portions of the mechanism. The mechanism 27 includes, as best shown in Figs. 1, 2 and 5, an elongated rod 93 slidably mounted for linear movement in a bearing 94 secured to the end of a hollow shaft 95. The shaft 95 is rotatably mounted in bearings 96 and 97 secured to horizontal framework members 34 and 35 above and to the rear of the coagulant tank 14. Bearing 94 and rod 93 are adapted to be rotated by a lever arm 98 secured to the hollow shaft 95. Lever arm 98 has a freely rotatable cam follower roller 99 secured to the free end thereof which engages the peripheral edge of a disc cam 100. Cam 100 is secured to shaft 40.

Linear movement is imparted to the rod 93 by means of a flexible cable 102 which is connected at one end to the lower end of the rod 93 and is directed up and around sheaves 103 and 104 and through the bore of a hollow shaft 105 which is rotatably mounted in the bore of the shaft 95. From the end of the shaft 105 the cable 102 is directed over a freely rotatable sheave 106 carried by a bracket 107 secured to the framework 52 at the rear of the machine. The end of the cable 102 is pivotally secured, as best shown in Fig. 4, to the free end of a lever arm 108. The lever 108 is pivotally attached to a bracket 109 which in turn is secured to a framework member 110 at one side of the machine. A freely rotatable cam follower roller 111 attached to the lever 108 engages the peripheral edge of a disc cam 112 secured to the shaft 40. Pivotal movement of the arm 108 imparted thereto by rotation of the cam 112 is thereby transformed into linear movement of the rod 93 by the cable 102.

An arm 113 is rotatably mounted on the end of the rod 93 and is provided with an integral clamping jaw 114 and an air cylinder 115 for clamping the plate 25 secured to the end of the rod 16 thereto. Arm 113 is adapted to be rotated by rotation of shaft 105 through sprocket 116 secured to the end of shaft 105, chain 117, dual sprocket 118, chain 119, and sprocket 120 in the same manner as described in conjunction with the arm 58 of the mechanism 26. Hinged arms 121 and 122 similar to the arms 70 and 72 of the mechanism 26 support the dual sprocket 118 and serve to maintain constant center distances between the sprockets 116, 118 and 120.

Shaft 105 is rotated by a chain 123 which engages a sprocket 124 secured to the rear end of the shaft 105. The chain 123 is directed over a freely rotatable sprocket 125 secured to a framework member 126 and has a weight 127 secured to the end thereof. The opposite end of the chain 123 is connected to a link member 128 which in turn is pivotally attached at its other end to the free end of a lever arm 129 as best shown in Fig. 4. Lever arm 129 is pivotally attached to the bracket 109 secured to the framework member 110 at one side of the machine. Lever 129 is provided with a freely rotatable cam follower roller 130, which, as best shown in Fig. 5, engages the peripheral edge of a disc cam 131 secured to the shaft 40. Pivotal movement of the lever arm 129 imparted thereto by the cam 131 serves to rotate the arm 113.

Figure 8:
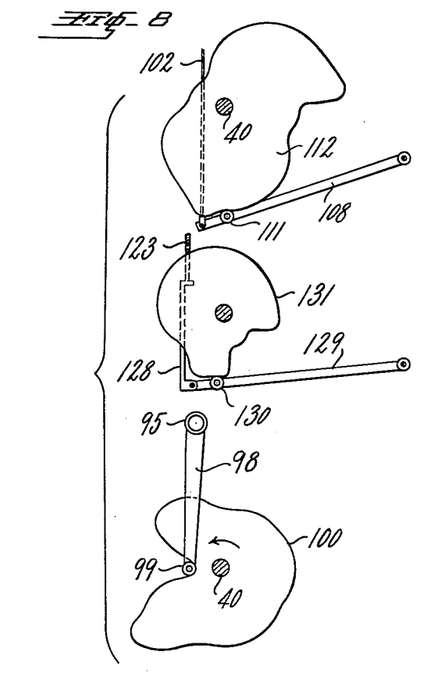
Fig. 8 is a front elevational view showing the approximate profiles of each of the actuating cams for moving the left hand arm assembly and the position of the cams and actuating levers when the arm is in the transfer position shown in Fig. 2.

From the above description, it can be seen that the rod 93, like the rod 28, is capable of both pivotal and linear movement and that the arm 113 is capable of rotary movement with respect to the end of the rod 93. These motions are combined to give a desired resultant path of movement to the forms 15 clamped to the arm 113 by the selection of proper shaped cams 100, 112 and 131. In Fig. 8, there is shown the approximate shape of the cams 100, 112 and 131 for imparting to the forms 15 the path of movement in dipping them into the coagulant tank 14 as shown in Fig. 10. As shown in Fig. 10, the forms are picked up at the mid point of the machine and are dipped into the coagulant tank 14 toe first. The forms are then withdrawn from the coagulant tank 14 toe last and inverted so that they can be picked up by the conveyor 22. The movements of the arm assemblies 26 and 27 are correlated by reason of the cams 39, 57, 92, 100, 112 and 131 being mounted on the same shaft 40.

The arm assemblies 26 and 27 are laterally offset with respect to one another so that the upper ends, of rods 28 and 93, may pass by each other as shown in Fig. 1. It will be noted that arms 58 and 113 are correspondingly offset with respect to arm assemblies 26 and 27, to bring arms 58 and 113 opposite each other, so that transfer of the rod 16 secured to the plate 25 may be effected. This is best shown in Fig. 5.

Figures 11, 12:
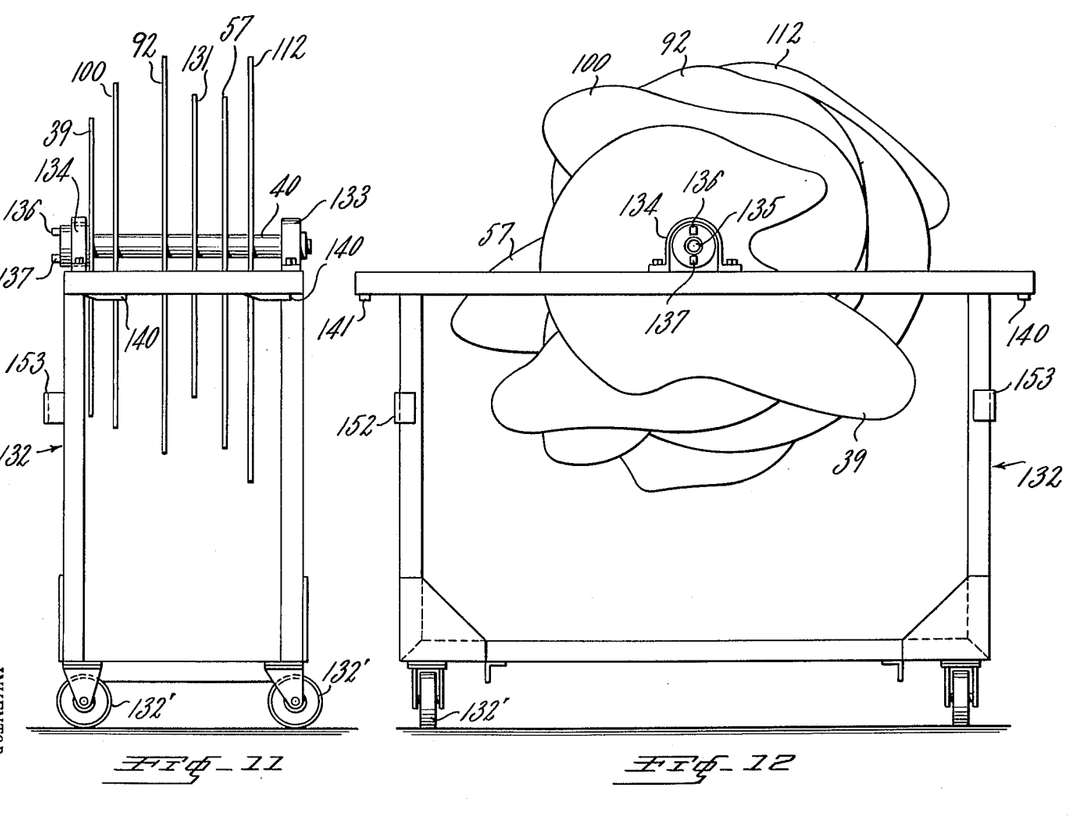
Fig. 11 is a side elevational view of the actuating cams and the carriage on which they are mounted.
Fig. 12 is a front elevational view of the actuating cams and the carriage on which they are mounted.

To render the machine more flexible so that different shaped and sized forms may be dipped and different paths of movement imparted thereto, the shaft 40 to which the cams 39, 57, 92, 100, 112 and 131 are secured is mounted on a carriage 132, as best shown in Figs. 11 and 12, so that the cams as a unit may be easily removed from the machine and replaced with a set of different shaped cams mounted on a similar carriage. The carriage 132 is mounted on casters 132' to facilitate movement thereof.

The shaft 40 is rotatably mounted and supported at one end in a self-aligning bearing 133 which is secured to the top of the carriage 132. The other end of the shaft 40 is not journalled, but its weight is carried by the carriage 132 when the carriage is withdrawn from the machine. Movement of the unjournalled end of the shaft 40 is limited by a guard strap 134 surrounding the end thereof and secured to the top of the carriage 132. This construction facilitates alignment of the shafts 40 and 41 without also requiring alignment of the carriage 132.

Figure 7:
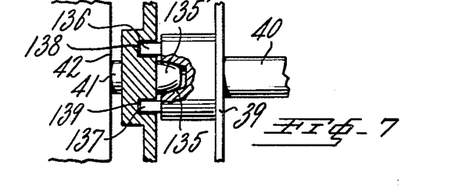
Fig. 7 is an enlarged view, partly in section, showing the details of the coupling between the shaft upon which the actuating cams are mounted and the driving mechanism.

The unjournalled end of the shaft 40 is provided with a tapered recess 135, best shown in Fig. 7, which is adapted to receive a tapered and rounded pilot projection 135' on the end of the output shaft 41 of the speed reducer 42. Recess 135 and pilot projection 135' facilitate alignment of the end of the shaft 40 and the output shaft 41. Integral projecting keys 136 and 137 formed on the end of the shaft 40 are adapted to be received in corresponding recesses 138 and 139 in the end of the output shaft 41 to provide a driving connection therebetween. Preferably keys 136 and 137 and recesses 138 and 139, are shaped to allow mating in only one rotational position.

In positioning the cams in the machine, the carriage 132 is pushed into the rear of the machine until the pilot projection 135 is received in the recess 134 and the keys 136 and 137 received in the recesses 138 and 139. As the carriage 132 is pushed into the machine, wedge-tipped blocks 140 and 141 secured to each side of the carriage 132 engage similar wedge-tipped blocks 142 secured to horizontal framework member 143 on each side of the machine, so that the carriage is lifted off the casters 132' as shown in Fig. 6. The purpose of lifting the carriage 132 off the casters 132' when it is positioned in the machine is to facilitate alignment of the shafts 40 and 41 without the necessity of providing a perfectly plane floor surface. It also serves to combine the cam carriage 132 with the rest of the machine as a unitary structure.

To lock the carriage 132 in place and to facilitate drawing the carriage into place, a special locking arrangement is provided. As best shown in Figs. 4, 5 and 6, this locking arrangement includes rollers 144 and 145 which are attached to arms 146 and 147. The arms 146 and 147 are secured to a shaft 148 adjacent each end thereof. Shaft 148 is rotatably mounted in bearings 149 and 149' secured to framework members 150 and 150'. The shaft 148 is adapted to be rotated by means of a lever arm 151 secured to one end thereof to engage the rollers 144 and 145 behind one leg of L-shaped brackets 152 and 153 secured to the front of the carriage 132. Second lever arms 154 and 154' secured to the shaft 148 have weights 155 and 155' attached to the end thereof which serve to hold the rollers 144 and 145 in engagement with the L-shaped brackets 152 and 153 to prevent rearward movement of the carriage 132.

Figure 13:
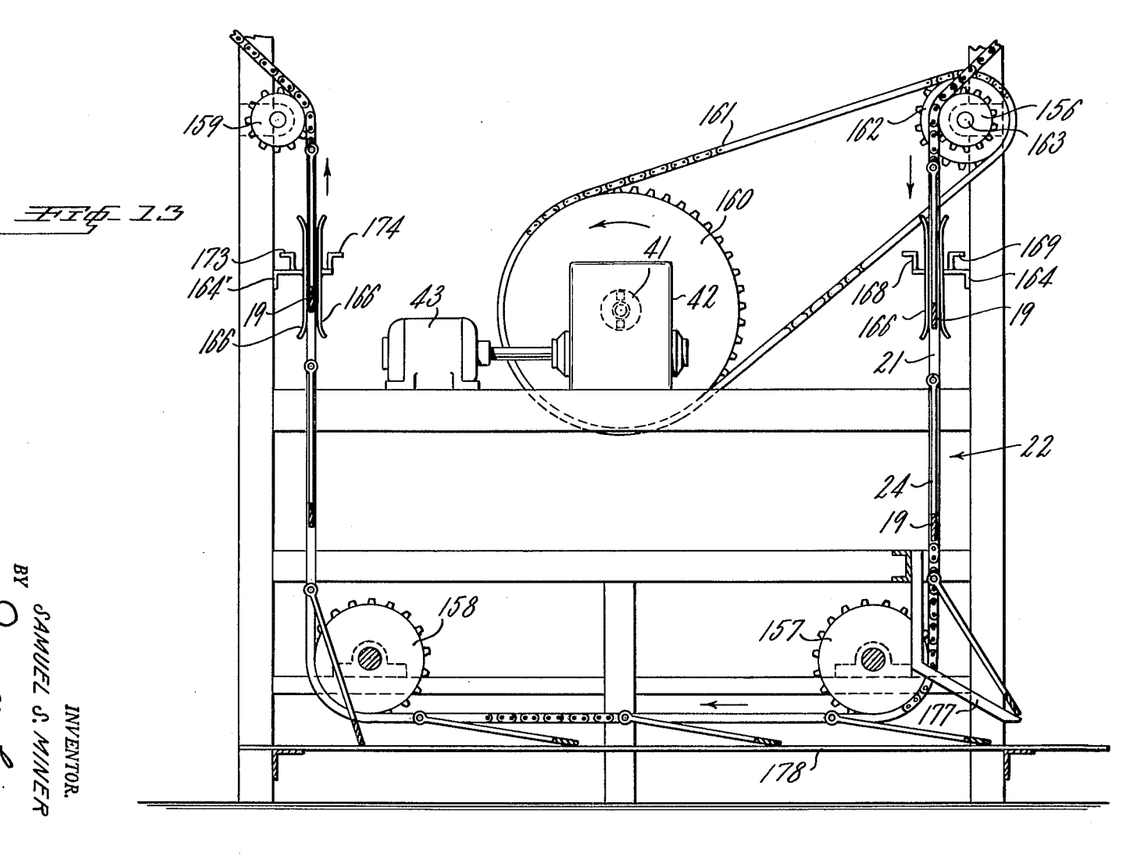
Fig. 13 is a front elevational view of the machine with parts removed to show details of the driving mechanism for the conveyor.

Referring to Figs. 1, 2 and 13, the chain conveyor 22 is directed over sprockets 156 and moves down the side of the latex tank 13, under sprockets 157 and 158, up the side of the coagulant tank 14 and over sprockets 159. The movement of the chain conveyor is correlated with that of the arm assemblies 26 and 27 by its being driven from the output shaft 41 of the speed reducer 42 by a chain drive including a sprocket 160 secured to the output shaft 41, a chain 161 and a sprocket 162 which is secured to the end of a shaft 163 to which the conveyor sprockets 156 are attached.

Adjacent the latex tank 13 and the coagulant tank 14, the conveyor 22 passes between vertically extending guide members 166 which are secured to the framework of the machine adjacent each side of the conveyor 22 by means of the brackets 164 and 165, and 164' and 165'. Guide members 166 insure that the crossbar 19 of the conveyor 22 is in the same vertical plane as the chains 20 and 21 of the conveyor 22, when the plate 25 secured to the end of the rod 16 carried by the crossbar 19 is to be clamped or released by the air cylinders 61 and 115, during removal from or transferred to the conveyor 22.

Stationary platforms 168 and 169 are secured to the bracket 164 and stationary platforms 170 and 171 are secured to the bracket 165. As the conveyor 22 moves downwardly, the plate 25 and a similar plate 172 secured to the opposite end of the rod 16 engage the platforms 168, 169, 170 and 171 which halt the descent of the rod 16 and support it until the arm assembly 26 moves over to pick it up. Simultaneously the crossbar of the conveyor 22 continues its downward motion. Similar platforms 173, 174, 175 and 176 are secured to brackets 164' and 165'. The arm assembly 27 deposits the rod 16 and the forms 15 secured thereto on these platforms. As conveyor 22 moves upwardly between the platforms 173, 174, 175 and 176, the crossbar 19 of the conveyor 22 engages the bifurcated lugs 17 and 18 of the rod 16 and lifts the rod 16 and the forms 15 secured thereto off the platforms and carries it with the conveyor 22.

In order to conserve space, the crossbars 19 which are pivotally hung between the individual chains 20 and 21 of the conveyor 22 are folded towards the chains 20 and 21, as shown in Figs. 1 and 13, in the passage of the conveyor 22 beneath the tanks 13 and 14. To insure that the bars 19 will be folded in the proper direction, an L-shaped cam bar 177 secured to the framework pivots the bars 19 out from the conveyor 22 as it moves downwardly until the bars 19 drop off the end of the cam bar 177 onto a horizontal guide plate 178 secured to the framework of the machine adjacent the bottom thereof.

Figure 16:
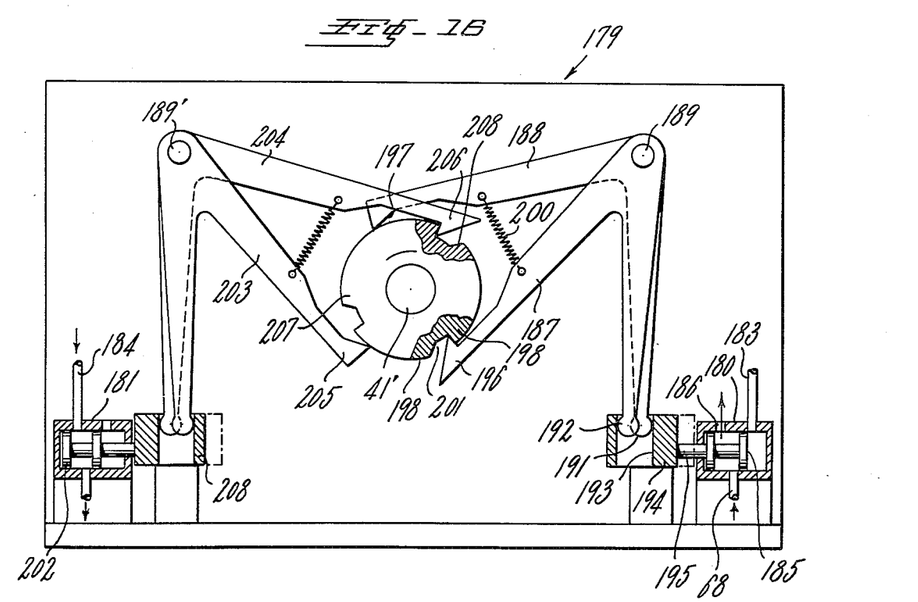
Fig. 16 is a front elevational view showing details of the control system for controlling the admission of air to the air cylinders for clamping the forms to the arm assemblies.
Figure 17:
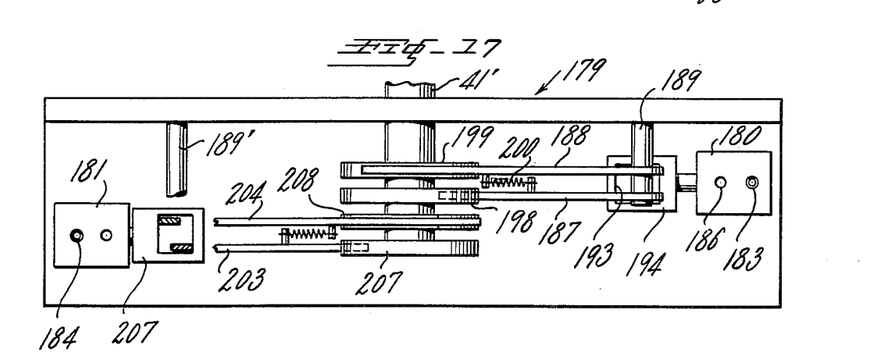
Fig. 17 is a top plan view with parts broken away of the control system of Fig. 16.

In order to actuate the air cylinders 61 and 115 in timed relationship with the movement of the arm assemblies 26 and 27 so that plate 25 secured to the end of the rod 16 to which the forms 15 are secured is grasped and released at the proper time, a special control system is provided to control the admission of air to the cylinders. This control system which is generally designated by the reference numeral 179 is positioned, as shown in Fig. 6, in front of the speed reducer 42 and is mounted on an extension 41' of the output shaft 41 which extends from the front of the speed reducer 42. Referring to Figs. 16 and 17, the control system 179 includes two slide valves 180 and 181. Slide valve 180 is connected to air cylinder 61 through flexible conduit 68, hollow shaft 59, and conduit 67, and controls admission of air thereto. Slide valve 181 is connected to air cylinder 115 through a similar connection including a flexible conduit 182 and controls the admission of air thereto. Sufficient slack is provided in the conduits 68 and 182 to allow free movement of the arm assemblies 26 and 27. Slide valve 180 is connected to a source of air under pressure (not shown) by means of a conduit 183 and slide valve 181 is connected to the same source of air under pressure by conduit 184. Movement of slide 185 of valve 180 in one direction connects conduit 68 with exhaust port 186 to exhaust air from air cylinder 61 and movement of the slide 185 in the other direction connects conduit 68 with conduit 183 to admit air to air cylinder 61.

The slide 185 is moved by bell crank levers 187 and 188 which are pivotally mounted on a pivot pin 189 which is secured to and extends from a vertically extending plate 190. One arm of each of the levers 187 and 188 extends downwardly and rounded ends 191 and 192 thereof extend into an opening 193 in a connector block 194 which is secured to the slide 185 by a connecting rod 195. The other arm of each of the levers 187 and 188 extends toward the extension shaft 41' and the respective ends 196 and 197 thereof engage respectively disc cams 198 and 199 secured to the shaft 41'. Lever 187 extends on one side of the shaft 41' and lever 188 extends on the other side of the shaft 41' and an extension spring 200 secured at each end to the levers 187 and 188 urges the ends 196 and 197 against the cams 198 and 199. Cam 198 is provided with a notch 201 in the peripheral edge thereof into which the tip 196 of the lever 187 drops when the shaft 41' rotates the cam 198 to a position where the notch 201 is in alignment with the tip 196 of the lever 187. When the tip 196 drops in the notch 201, the lever 187 pivots in a direction to shift the slide 185 to the position shown in Fig. 16. Cam 199 is also provided with a notch (not shown) into which the tip 197 of the lever 188 is adapted to drop to shift the slide 185 in the other direction to connect the conduit 68 with the conduit 183 to admit pressure to the air cylinder 61. It will be noted that the notch 201 in the cam 198 has its leading edge coinciding with a radius of the cam 198, whereas its trailing edge is gradually inclined toward the periphery of the cam 198. Tip 196 of the lever 187 is shaped in a complementary fashion to the notch 201. By this means the entry of the tip 196 into the notch 201 is substantially instantaneous when the notch 201 advances to a point opposite the tip 196. Restoration of the lever 187 to its original position is effected as the tip 196 is forced outwardly by the trailing edge of the notch 201. It is to be noted that the opening 193 in the connector block 194 is wider than the ends 191 and 192 of the levers 187 and 188 so that the slide 185 is shifted only when one of the ends 196 or 197 of the levers 187 and 188 drops into a notch in the cams 198 or 199 and not when they move out of the notches. The slide 185 is shifted in a direction to exhaust air from the air cylinder 61 only when the end 196 of the lever 187 drops into the notch in cam 198, and the slide 185 is shifted in the other direction to admit air under pressure to the air cylinder 61 only when the end 197 of the lever 188 drops into the notch in cam 198.

The slide 202 of the valve 181 is moved in a similar manner to admit and exhaust air from air cylinder 115 at the proper time by bell cranks 203 and 204, the tips 205 and 206 of which engage notched cams 207 and 208 secured to the shaft 41'. The other ends of the bell cranks 203 and 204 engage a connector block 209 secured to the slide 202.

The cams 198, 199, 207 and 208 are notched in an identical fashion, but the tips 196 and 197, and 206 and 207, are of two kinds. Tips 196 and 206 are alike since the cam notches to which they correspond approach these tips in a direction toward the pivot points 189 and 189'. Tips 197 and 205 are alike but dissimilar from tips 196 and 206, since the cam notches to which tips 197 and 205 correspond, approach these tips in a direction away from arm pivot points 189 and 189'.

In both cases therefore, the arm tips will enter the notches substantially instantaneously and will be restored to original position gradually.

It will be understood from the foregoing description of mechanism 179, that owing to the radially shaped leading edges of the cam notches, the movement of the valve slides 185 and 202 is always rapid, and it is impossible for a valve slide to be stopped in a partially open or closed position in the event that the entire mechanism is stopped. In this way it is insured that transfer operations are always quickly performed. Additionally, it is insured that the mechanism may be stopped at will without fear that such stoppage might occur when either of the clamps of the arm assemblies 26 and 27 is in the act of opening or closing. The cams 198 and 199 are secured to the shaft 41' and are oriented with respect to the cams 29, 57 and 92, and bell cranks 187 and 188, so that the valve 188 is actuated to admit air under pressure to air cylinder 61 when the arm assembly 26 has moved the air cylinder 61 to the position shown in Fig. 1 so that it may clamp the rod 16 and forms 15 secured thereto to the arm 58 and to release the pressure from the air cylinder 61 when the rod 16 and forms 15 secured thereto have been moved to the transfer position as shown in Fig. 2.

The cams 207 and 208 are secured to the shaft 41 and are oriented with respect to the cams 160, 112 and 102, and bell cranks 203 and 204, so that the valve 181 is actuated to admit air to air cylinder 115 when the arm assembly 27 is in the transfer position as shown in Fig. 2 to clamp the plate 25 secured to the end of the rod 16 when it is released by the air cylinder 61, and to release the pressure from the air cylinder 115 when the arm assembly 27 is adjacent the conveyor 22 as shown in Fig. 1 so that the rod 16 and the forms 15 secured thereto are deposited on the crossbar 19 of the conveyor 22.

Figure 18:
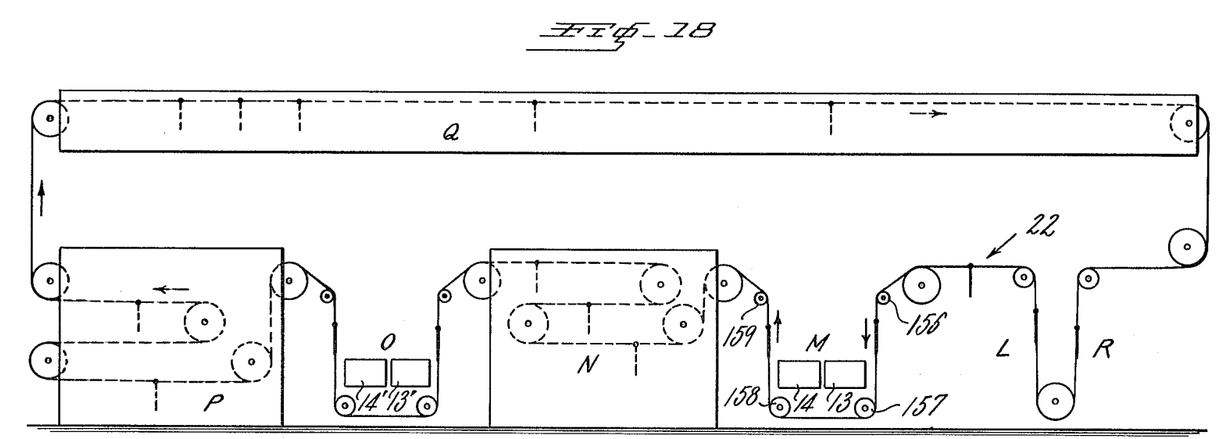
Fig. 18 is a schematic drawing showing how the conveyor may be used to convey the forms through two or more dipping operations and two or more drying ovens or leaching chambers.

While the chain conveyor 22 is only partially shown in Figs. 1, 2, 5 and 13, it is to be understood that it is of the endless type as schematically shown in Fig. 18. As shown in Fig. 18, the same conveyor may be used to convey the forms to and from one or more dipping machines and through one or more drying ovens or leaching chambers. In Fig. 18, the rod 16 and the form 15 secured thereto are placed on the continuously moving conveyor 22 at point L. From point L, the forms 15 are carried to point M where they are removed from the conveyor, dipped in latex and coagulant tanks 13 and 14 and replaced on the conveyor 22 by a machine of the type shown in Fig. 1. From point M, the dipped forms are carried through a drying oven N where they are dried. From the oven N, the forms are conveyed to point O where they are again removed from the conveyor, dipped in another set of latex and coagulant tanks 13' and 14' and replaced on the conveyor 22 by a machine of the type shown in Fig. 1. From point O the forms 15 are conveyed through another drying oven P and from oven P they are conveyed through an overhead leaching and drying chamber Q. At point R the forms are removed from the conveyor 22. While only two dipping stations are shown, it is to be understood that any number of dipping stations can be included in the conveyor line.

From the above description it can be seen that there is provided novel apparatus for removing articles from a conveyor, moving the articles in an intricate predetermined path, and replacing the articles on the conveyor. The apparatus is extremely flexible in that the path or movement of the articles and the speed of movement may be changed as desired by the substitution of different sets of control cams.

Although the apparatus has been described as having two arm assemblies, it should be understood that one, three, or more arm assemblies may be employed in accordance with the requirements of any particular use. In like manner, it should be understood that the number of cams is not critical, but may be increased or decreased to vary the number and kind of motions it is desired to impart to the articles being processed.

While the apparatus has been disclosed and described as used for dipping forms into latex and coagulant baths to form thin walled rubber articles, it is to be understood that the apparatus may be used for other operations where it is desired to move an article in a predetermined path or to present an article in different positions. For example, the apparatus would be useful for supporting and moving an article so that it can be sprayed with paint or some other liquid. By the use of properly shaped cams, the apparatus could also be used to support an article in a predetermined stationary position for a sufficient time to allow any desired operation to be performed on the article, such as, embossing the article or applying labels to the article.

It is to be understood that the above description and accompanying drawings are for the purpose of illustration only and not by way of limitation and changes and modifications may be made therein without departing from the spirit and the scope of the invention.

Having thus described my invention, what I claim and desire to protect by Letters Patent is:

1. Apparatus for imparting a predetermined path of movement to an article comprising, a frame, a hollow shaft rotatably mounted on said frame, an elongated rod, means mounting said rod for rotary movement with said shaft and linear movement with respect to said shaft, means for rotating said shaft, means for effecting linear movement of said rod, an arm rotatably mounted on said rod adjacent one end thereof, means for attaching an article to said arm, a pair of elongated members hinged together at one of their ends, one of said members being rotatably mounted at its other end on said shaft, the other end of the other member being rotatably secured to said arm, a second shaft rotatably mounted in said hollow shaft, first pulley means secured to said second shaft, second pulley means rotatably mounted on said hinged members at their hinge point, third pulley means connected to said arm, flexible driving means interconnecting said pulley means, and means for rotating said second shaft.

2. Apparatus for imparting a predetermined path of movement to an article, comprising, a frame, a hollow shaft rotatably mounted on said frame, an elongated rod, means mounting said rod for rotary movement with said hollow shaft and linear movement with respect to said hollow shaft, means for rotating said hollow shaft, a flexible element connected to said arm and means for moving said flexible element to effect linear movement of said rod, an arm rotatably mounted on said rod adjacent one end thereof, means for attaching an article to said arm, a pair of elongated members hinged together at one of their ends, one of said members being rotatably mounted at its other end on said hollow shaft, the other end of the other member being rotatably secured to said arm, a second shaft rotatably mounted in said hollow shaft, first pulley means secured to said second shaft, second pulley means rotatably mounted on said hinged members at their hinge point, third pulley means connected to said arm, flexible driving means interconnecting said pulley means, and means for rotating said second shaft.

3. Apparatus for imparting a predetermined path of movement to an article comprising a frame, a hollow shaft rotatably mounted on said frame, an elongated rod, means mounting said rod for rotary movement with said hollow shaft, means for rotating said shaft, an arm rotatably mounted on said rod adjacent one end thereof, means for attaching an article to said arm, a pair of elongated members hinged together at one of their ends, one of said members being rotatably mounted at its other end on said hollow shaft, the other of said members being rotatably secured at its other end to said arm, a second shaft rotatably mounted in said hollow shaft, first pulley means secured to said second shaft, second pulley means rotatably mounted on said hinged members at their hinge point, third pulley means connected to said arm, flexible driving means interconnecting said pulley means and means for rotating said second shaft.

4. Dipping apparatus comprising, a frame, a first and second tank supported on said frame, a first elongated rod pivotally and slidably mounted on said frame above said first tank, means pivotally mounted on one end of said rod for gripping and supporting a dipping form, a second elongated rod pivotally and slidably mounted on said frame above said second tank, means pivotally mounted on one end of said second rod for gripping and supporting a dipping form, and means for effecting and correlating the pivotal and sliding movement of said first and second rods and the pivotal movement of said means mounted on the ends of said first and second rods so that a form gripped and supported by said means mounted on the end of said first rod is dipped in said first tank and transferred to said means mounted on the end of said second arm and dipped in said second tank.

5. Dipping apparatus comprising, a frame, a first and second tank supported on said frame, conveyor means for moving dipping forms to a point adjacent said first tank and for moving dipping forms away from a point adjacent said second tank, a first elongated rod pivotally and slidably mounted on said frame above said first tank, means pivotally mounted on one end of said rod for gripping and supporting a dipping form, a second elongated rod pivotally and slidably mounted on said frame above said second tank, means pivotally mounted on one end of said second rod for gripping and supporting a dipping form, and means correlating the movement of said conveyor means and the pivotal and sliding movement of said first and second rods and the pivotal movement of said means mounted on the ends of said first and second rods so that a dipping form is gripped by said means mounted on the end of said first rod and removed from said conveyor means adjacent said first tank and dipped in said first tank and transferred to said means mounted on the end of said second rod and gripped and supported thereby and dipped in said second tank and deposited on said conveyor means adjacent said second tank.

6. Dipping apparatus comprising, a first tank and a second tank, conveyor means for moving said dipping forms to a point adjacent said first tank and for moving dipping forms away from a point adjacent said second tank, a first elongated rod pivotally and slidably mounted on said frame above said first tank, means attached to the end of said rod for gripping and supporting a dipping form, a second elongated rod pivotally and slidably mounted on said frame above said second tank, means attached to the end of said second rod for gripping and supporting a dipping form, and means for effecting and correlating the movement of said conveyor means and the pivotal and sliding movement of said first and second rods so that a dipping form is gripped by said means mounted on the end of said first rod and removed from said conveyor means adjacent said first tank and dipped in said first tank and transferred to said means mounted on the end of said second arm and gripped and supported thereby and dipped in said second tank and deposited on said conveyor means adjacent said second tank.

7. Apparatus for imparting a predetermined path of movement to an article comprising, a frame, a hollow shaft rotatably mounted on said frame, an elongated rod, means mounting said rod for rotary movement with said hollow shaft, an arm rotatably mounted on said rod adjacent one end thereof, means for attaching an article to said arm, a pair of elongated members hinged together at one of their ends, one of said members being rotatably mounted at its other end on said hollow shaft, the other of said members being rotatably secured at its other end to said arm, a second shaft rotatably mounted in said hollow shaft, first pulley means secured to said second shaft, second pulley means rotatably mounted on said hinged members at their hinge point, third pulley means connected to said arm, flexible driving means interconnecting said pulley means, cam means, means for rotating said cam means, and means interconnecting said cam means and said hollow shaft and said second shaft for effecting in timed relationship rotation of said hollow shaft and said second shaft.

8. Apparatus for imparting a predetermined path of movement to an article comprising, a frame, a hollow shaft rotatably mounted on said frame, an elongated rod, means mounting said rod for rotary movement with said hollow shaft and linear movement with respect to said hollow shaft, a flexible element connected to said arm, an arm rotatably mounted on said rod adjacent one end thereof, means for attaching an article to said arm, a pair of elongated members hinged together at one of their ends, one of said members being rotatably mounted at its other end on said hollow shaft, the other end of the other member being rotatably secured to said arm, a second shaft rotatably mounted in said hollow shaft, first pulley means secured to said second shaft, second pulley means rotatably mounted on said hinge members at the hinge point, third pulley means connected to said arm, flexible driving means interconnecting said pulley means, cam means, means for rotating said cam means, and means interconnecting said cam means, said hollow shaft, said second shaft and said flexible element for effecting in timed relationship rotary movement of said hollow shaft and said second shaft and linear movement of said flexible element.

References Cited in the file of this patent

UNITED STATES PATENTS

| | | |
|---|---|---|
| 527,628 | Thomas | Oct. 16, 1894 |
| 1,766,574 | Westin et al. | June 24, 1930 |
| 2,392,799 | Scholes et al. | Jan. 8, 1946 |
| 2,476,249 | Payne, Jr. | July 12, 1949 |
| 2,609,776 | Sahlin | Sept. 9, 1952 |
| 2,632,574 | Goertz | Mar. 24, 1953 |